United States Patent [19]

Jost et al.

[11] Patent Number: 5,039,532

[45] Date of Patent: Aug. 13, 1991

[54] PREPARATION OF A HYPOALLERGENIC WHEY PROTEIN HYDROLYZATE AND FOOD

[75] Inventors: Rolf Jost, La Tour-de-Peilz; Niklaus Meister, Grosshoechstetten; Julio C. Monti, Corsier, all of Switzerland

[73] Assignee: Nestec S.A., Vevey, Switzerland

[21] Appl. No.: 273,440

[22] Filed: Nov. 18, 1988

[30] Foreign Application Priority Data

Dec. 23, 1987 [EP] European Pat. Off. ......... 87119104.5

[51] Int. Cl.$^5$ .............................................. A23C 21/02
[52] U.S. Cl. ........................................ 426/41; 426/61; 426/63; 426/657; 426/42
[58] Field of Search ................ 426/7, 34, 41, 42, 61, 426/63, 657, 801

[56] References Cited

U.S. PATENT DOCUMENTS

| 3,857,966 | 12/1974 | Feldman et al. | 426/7 |
|---|---|---|---|
| 4,293,571 | 10/1981 | Olofsson et al. | 426/7 |
| 4,427,658 | 6/1984 | Maubois | 426/7 |

FOREIGN PATENT DOCUMENTS 0055172  6/1982  European Pat. Off. .
0087247  8/1983  European Pat. Off. .

OTHER PUBLICATIONS

Blatt et al., "A Modified Untrafiltration Cell for Separating the Products of Proteolysis," Analytical Biochemistry 22, 161-165 (1968).

*Primary Examiner*—Marianne Cintins
*Attorney, Agent, or Firm*—Vogt & O'Donnell

[57] ABSTRACT

To prepare a hypoallergenic whey protein hydrolyzate product, particularly for employment in infant formula, whey material first is hydrolyzed with a proteolytic enzyme and then the enzymatic hydrolyzate is subjected to a heat treatment to denature proteins which remain intact after the first hydrolysis and which constitute allergens, and then the heated hydrolyzate is cooled. The cooled heat-treated hydrolyzate then is hydrolyzed by a proteolytic enzyme to provide a hydrolyzate substantially free of allergens of protean origin.

25 Claims, No Drawings

PREPARATION OF A HYPOALLERGENIC WHEY PROTEIN HYDROLYZATE AND FOOD

BACKGROUND OF THE INVENTION

This invention relates to the preparation of food products of reduced allergenicity.

It is known that allergies to cows' milk and to the milks containing cows' milk adapted to the needs of infants are due to the fact that the whey proteins of cows' milk differ from the proteins of mother's milk and can constitute allergens. Among the latter, the principal recognized allergens are, primarily, alpha-lactalbumin (aLA) and beta-lactolglobulin (bLG) and, to a lesser extent, the immunoglobulins (particularly IgG) and serum albumin (BSA).

Attempts have been made to eliminate their allergenicity by converting them into peptides by hydrolysis.

According to U.S. Pat. No. 4,293,571, a protein hydrolyzate is prepared by pancreatic hydrolysis, the non-hydrolyzed proteins are coagulated by a heat treatment, the hydrolyzate is then subjected to ultrafiltration to eliminate the coagulated residual proteins and the macropeptides which could constitute allergens.

It has also been proposed, cf. for example, in Blatt et al, Anal. Biochem. 22: 161-165, or in European patent application No. 22 019, directly to hydrolyze whey proteins in an ultra-filtration plant and to collect the peptides as they are formed. In a membrane reactor of the type in question, the non-hydrolyzed proteins remain in the retentate which is recycled to the hydrolysis compartment to be re-hydrolyzed. It would appear that, even under these conditions, it is not possible in practice completely to hydrolyze all the whey proteins. The serum albumin, for example, accumulates in the hydrolysis reactor. The various species of immunoglobulins are also resistant to hydrolysis by the pancreatic enzymes and are only partially split. The large fragments or macropeptides obtained by hydrolysis of the immunoglobulin of bovine colostrum (IgG) using trypsin or papain largely retain the allergenicity of IgG.

In conclusion, it is accepted that it is not sufficient to degrade aLA and bLG because BSA and IgG constitute allergens for human beings and have been described as such. With known methods of physical separation, the minor proteins of high nutritional value are lost.

SUMMARY OF THE INVENTION

The object of the present invention is to provide a process for the preparation of a hydrolyzate of animal milk proteins substantially free from allergens of protean origin, in which a whey product is subjected to enzymatic hydrolysis.

The process according to the invention is characterized in that the enzymatic hydrolyzate is heat-treated in aqueous solution for 3 to 10 minutes at 80° to 100° C. and at a pH value of 6 to 8, the hydrolyzate is cooled to 40° to 60° C. and then subjected to a second hydrolysis with a proteolytic enzyme in order to hydrolyze the minor proteins remaining intact after the first hydrolysis, after which the enzyme is thermally inactivated.

A major advantage of the process according to the invention is that residual proteins of high nutritional value do not have to be eliminated by physical separation.

A product of the present invention comprises hydrolyzed whey protein material from which allergens consisting of alpha-lactolbermin, beta-lactoglobulin, serum albumin and immunoglobulins have not been removed and wherein the hydrolyzed protein material including hydrolyzed allergens is in a form of hydrolysis residues having a molecular weight not above 10,000 so that the hydrolyzed material is substantially free from allergenic proteins and allergens of protein origin.

The hydrolyzate obtained is particularly intended for the feeding of infants where there is a risk of allergy or where allergy has been acquired.

DETAILED DESCRIPTION OF THE INVENTION

In the context of the present invention, the term "allergen" is to be understood as a "protein or macropeptide capable of initiating allergic reactions in humans, particularly sensitive infants or nurslings". A hydolyzate or a food containing such a hydrolyzate is considered to be hypoallergenic when it is no longer possible to detect the presence of proteins or large fragments or macropeptides having a molecular weight above about 10,000 by standard analytical techniques, for example by high-performance liquid chromatography (HPLC), by zonal electrophoresis using polyacrylamide gel (SDS-PAGE) or, when these methods are no longer capable of detecting antigens of protean or macropeptide origin, by immunological methods, for example by double immunodiffusion (ID).

The process according to the invention may be carried out using any enzymatic hydrolyzate of a whey starting material containing the whey proteins. This starting material may be a whey from cheese making, particularly a sweet whey such as that resulting from the coagulation of casein by rennet, an acidic whey from the coagulation of casein by an acid, or the acidifying ferments, or even a mixed whey resulting from coagulation by an acid and by rennet.

This starting material may be a whey demineralized by ion exchange and/or by electrodialysis. This whey may be a concentrate of whey proteins more or less free from lactose obtained, for example, by ultrafiltration optionally followed by dialysis. The starting material may even be a combination of the above-mentioned starting materials and lactose. It may be in the form of a true or colloidal aqueous solution or in the form of a powder. In the latter case, the powder is dissolved in preferably demineralized water to form an aqueous solution.

The starting material is subjected to enzymatic hydrolysis in known manner using mixed or purified proteolytic enzymes active in the basic and neutral ranges, for example trypsin, chymotrypsin or pancreatin.

The preliminary hydrolysis may be carried out for a relatively short time, preferably 5 to 35 minutes, for example 10 minutes, using a small quantity of enzyme, for example 10% of the total quantity used for the hydrolyses. This enables enzyme to be saved. In this case, hydrolysis is partial. This hydrolysis may be carried out in a reactor or, alternatively, in a tube.

In cases where the substrate to be hydrolyzed might tend to coagulate during the heat treatment, a chelating agent, such as calcium or magnesium citrate for example, may be added to the substrate, as indicated, for example, in U.S. Pat. No. 4,748,034.

According to the invention, the hydrolyzate is subjected to a heat treatment at 80° to 100° C. for 3 to 10 minutes at a pH value of 6 to 8. The heat treatment time and temperature are of course interrelated, the lower temperature limit corresponding to the upper time limit and vice versa. In industrial heat exchangers, a temperature of approximately 90° C. and a residence time of the order of 5 minutes have proved to be sufficient for denaturing the minor proteins. It has in, effect, been found that denaturing these proteins makes them accessible to the subsequent enzymatic degradation. It is advisable to mention that the heat treatment inactivates the enzyme.

The hydrolyzate is then cooled to a temperature of 40° to 60° C. and preferably to a temperature of approximately 55° C. which is the optimal temperature for the hydrolytic activity and the pH value is preferably adjusted to approximately 7.5 by addition of an aqueous solution of a base.

The conditions of the second hydrolysis may vary. In a first embodiment, the second hydrolysis is carried out discontinuously in batches in a thermostatically controlled tank reactor. After addition of the proteolytic enzyme selected from trypsin, chymotrypsin, pancreatin or a mixture of trypsin and chymotrypsin in aqueous solution, the hydrolysis is carried out for 60 to 180 minutes.

In a second, preferred embodiment, the second hydrolysis takes place continuously for 1 to 60 minutes and preferably for 2 to 20 minutes in a tube which constitutes the turbulent-state reactor. In this variant, the tube, depending on its length, provides the reaction time required according to the throughput of product to be hydrolyzed. Accordingly, the enzyme has to be pumped continuously to the entrance of the dwell tube. The resulting state of high turbulence brings about rapid and intense contact between the enzyme and the substrate.

Irrespective of the embodiment selected for the second hydrolysis, the hydrolysis product undergoes a heat treatment which inactivates the enzyme. This heat treatment comprises preheating the hydrolyzate to a temperature of or above 75° C. and keeping it at that temperature (preferably at 75° to 85° C.) for about 5 minutes to promote auto-digestion of the enzyme, this treatment advantageously being followed by sterilization, preferably at ultra-high temperature, for example at 125° to 135° C., for 2 to 3 minutes by injection of steam or in a heat exchanger.

The hydrolyzate may then be dried, for example by spray drying or by freeze drying for different applications, or may even be subsequently treated. In the latter case, the enzyme may be inactivated during the subsequent treatment.

The hydrolyzate prepared by the process according to the invention may be incorporated in numerous food preparations for dietetic use, particularly in foods for infants or convalescents, or in readily resorbable foods for use by people suffering from allergies.

The present invention also relates to a process for the preparation of a hypoallergenic food, characterized in that carbohydrates, mineral salts and fats in the liquid state optionally containing fat-soluble vitamins are added to the hydrolyzate, an aqueous solution containing water-soluble vitamins and oligoelements is optionally added and the whole is dried.

Drying may be carried out by freeze drying or, preferably, by spray drying.

Alternatively, the enzyme may be inactivated by sterilization at ultra-high temperature, after which the product is packed in the liquid state instead of being dried.

EXAMPLES

The invention is illustrated by the following Examples in which parts and percentages are by weight unless otherwise indicated.

In the examples, the analyses by the following methods are intended to demonstrate the absence of residual proteins or macropeptides after the second hydrolysis:

I/SDS-PAGES, according to Laemmli, U.K. 1970, Nature 227:680 et seq., under the specific conditions shown below:

| Parameter | Concentration gel | Separation gel |
| --- | --- | --- |
| Total acrylamide (%) | 5.4 | 13.3 |
| Crosslinking agent (%) | 2.6 | 2.6 |
| Sodium dodecyl sulfate (SDS, %), made up to 100% by addition of distilled water | 0.1 | 0.1 |
| pH | 6.8 | 8.8 |
| Dimensions of the gel layers on the plates (mm) | $102 \times 73 \times 0.5$ | |
| Sample ($\mu$g, calculated as total nitrogen, Nt) | 5–15 | |
| Current intensity (mA/plate) | 15 | |
| Developer: Coomassie Brilliant Blue G-250 | | |
| Electrophoresis buffer solution: 0.025 M Tris, 0.19 M glycine, 0.1% SDS. | | |

Preparation of the samples: the samples are dispersed in an aqueous buffer solution containing 1% SDS and dithiothreitol as reducing agent. The dispersion is rapidly heated to 100° C. and then alkylated with iodoacetamide in a 2M aqueous solution of Tris buffer, pH 8 (18 mg in 0.1 ml of buffer solution). In some cases, the reduction and alkylation steps are deliberately omitted to show the proteins in the non-reduced state.

Sensitivity: the method detects approximately 0.1 $\mu$g of the proteins BSA, aLA and bLG. The detection limit for the H and L chains of the IgG's and of the intact (non-reduced) IgG's is higher on account of the diffuse character of the bands.

II/ID, according to Outcherlony, o, Acta. Pathol. Microbiol. Scand. 26:507, under the following specific experimental conditions:

| Parameter | Conditions |
| --- | --- |
| Aqueous agar solution | 1.5% (weight/volume), type I agar of Calbiochem in a saline solution of phosphate buffer, pH 7.2, |
| Agar gels | on fixing film (product LKB no. 1850-102) |
| Orifice diameter (mm) | 3 |
| Coloration of the washed gels | Coomassie Brilliant Blue R-250 in a solution of ethanol, water and acetic acid (45/45/10, % volume/volume) |
| Decoloration | Coomassie Brilliant Blue R-250 in a solution of ethanol, water and acetic acid (45/45/10, % volume/volume) |

Method: the non-diluted sample consists of a physiological salt solution of 100 mg/ml. After successive dilutions in a ratio of 2:1, the successive orifices are filled on the one hand with the sample and, on the other hand, with the specific sera of rabbits, respectively anti-bLG, anti-aLA, anti-BSA and anti-IgG, in a concentration of 1/16th of the initial concentration of the sample. The detection of the protein corresponds to the antigen-antibody precipitation reaction. The first titer (expressed as a fraction of the initial concentration) corresponding to an absence of reaction is noted.

Sensitivity of the method: the concentration limit for the detection of aLA and bLG is around 20 µg/ml (volume of sample 10 µl) and, for the detection of BSA and IgG, around 40 µg/ml.

III/HPLC: according to Diosady, L. L. et al, 1980, Milchwissenschaft 35:671 and Bican, P. et al , 1982, Milchwissenschaft 37:592.

Analysis on a TSK 3000/SW column confirms the absence of a peak for BSA and IgG after the second hydrolysis by comparison with the intact proteins under the following conditions:

Solvent: buffer solution, 0.05M Tris-HCl, 4M guanidinium, pH 6.8
Sample: 1 mg hydrolysate or protein (control)
Detection: 280 nm, flow rate 1 ml/min
Column temperature: 20° C.
Condition of isocratic gradient.

EXAMPLE 1

24 g of demineralized acidic whey powder (DWP) are dispersed with stirring in demineralized water and slowly heated to dissolution. The resulting solution has a volume of 80 ml and a dry matter content of 30%.

The demineralized whey powder used has the following composition:

|  | % |
| --- | --- |
| Proteins (N × 6.38) | 11.9 |
| Fats | 0.8 |
| Lactose | 81 |
| Ash | 2.8 |
| Moisture | 3.5 |

The solution is placed in a double-walled reactor thermostatically controlled to 55° C. The pH value of the solution is increased to 8 by addition of a 20% (weight/volume) aqueous dispersion of Ca(OH)$_2$.

30 mg of porcine trypsin having a strength of 1500 units/mg (United States Pharmacopeia) are then added. There is a rapid reduction in the pH (due to the initiation of hydrolysis) which is stopped at pH 7.5 by addition of a 1N aqueous solution of KOH, the pH then being kept at that value with a pH-stat by automatic compensation with a 1N aqueous solution of KOH. The reaction continues for 4 h at 55° C., after which there is no further reaction detectable by titration.

The hydrolyzate is separated into four equal portions:

1a: an aqueous solution containing 6 mg soya trypsin inhibitor (STI) is added to 20 ml hydrolyzate to block the action of the trypsin, after which the solution is dried by freeze drying.

1b: 20 ml hydrolyzate are heated to 70° C. in 1 minute and kept at that temperature for 5 minutes.

1c: 20 ml hydrolyzate are heated to 80° C. in 2.5 minutes and kept at that temperature for 5 minutes.

1d: The rest of the hydrolyzate is heated to 90° C. in 4 minutes and kept at that temperature for 5 minutes.

The hydrolyzates 1b, 1c and 1d are rapidly cooled to 55° C. and then separately introduced into reactors. 30 mg of the preceding trypsin are added to each reactor. The reaction is then allowed to continue for 1 h at 55° C./pH 7.5, after which there is no further reaction detectable by titration. 6 mg STI are then added to each of the hydrolyzates which are then separately dried by freeze-drying. The hydrolyzates are designated 1e, 1f and 1g, respectively.

The results of analysis by electrophoresis (SDS-PAGE) and double immunodiffusion (ID) relating to the levels of bovine serumalbumin (BSA) and immunoglobulin G (IgG) are shown in Table 1 below:

TABLE 1

| Samples | BSA by SDS-PAGE | IgG by ID | by ID |
| --- | --- | --- | --- |
| 1a | +++ | 1/32 | 1/64 |
| 1b | +++ | 1/32 | 1/16 |
| 1c | +++ | ½ | 1/1 |
| 1d | +++ | ½ | 0 |
| 1e | +++ | 1/32 | 1/32 |
| 1f | + | ½ | 1/1 |
| 1g | 0 | 0 | 0 |

Results:
Whereas the titers by ID are
aLA: 1/256–1/512
bLG: 1/512–1/1024
BSA: ½–1/32 and
IgG: ½–1/64

Legend:
+++: ≧1 µg in 10 µg Nt
+: >0.1 µg in 10 µg Nt
0: undetectable. ≧0.1 µg in 10 µg Nt for an aqueous solution of 100 mg/ml of demineralized whey powder used, SDS-PAGE and ID do not enable the presence of alpha-lactalbumin (aLA) or beta-lactoglobulin (bLG) to be detected in any of the samples.

Hydrolysis is not sufficient to make the allergens constituted by the proteins BSA and IgG disappear (1a).

Even if the hydrolyzate is heat-treated, this is not sufficient to eliminate the BSA (1b, 1c, 1d).

To obtain a hydrolyzate of reduced allergenicity requires a suitable heat treatment followed by a second hydrolysis (1f, 1g).

EXAMPLE 2

150 g whey protein concentrate obtained by ultrafiltration of sweet whey (WPC) are dispersed in 1 liter demineralized water at 50° C. in a double-walled reactor thermostatically controlled to 50° C.

The whey protein concentrate used has the following composition:

|  | % |
| --- | --- |
| Proteins (N × 6.38) | 77.2 |
| Fats | 8 |
| Lactose | 3 |
| Ash | 7.3 |
| Moisture | 4.5 |

The initial pH value is increased from 6.6 to 7.9 by addition of a 20% (weight/volume)aqueous dispersion of Ca(OH)$_2$. The pH-stat is regulated to keep the pH at 7.3 by automatic compensation with a 2N aqueous solution of KOH.

7.5 g of pancreatic trypsin having a strength of 3 Anson units (AU)/g are added to initiate hydrolysis and the reaction is continued for 4 h at 50° C. The hydrolyzate is then heated to 90° C. by injection of steam and is kept at that temperature for 5 minutes. After cooling to 55° C., the pH is readjusted to 7.3 by automatic compensation with a 2N aqueous solution of KOH. 2 g porcine trypsin (strength 6 AU/g) are then introduced to initiate the second hydrolysis which is continued for 2 h with automatic compensation of the pH. The hydrolyzate is then heat-treated for 10 minutes at 90° C., rapidly cooled and then dried by freeze-drying.

To follow the hydrolysis, 1 ml samples are taken at various stages of the hydrolysis, 6 mg of STI are added to each sample, after which the samples are quick-frozen and then dried by freeze-drying.

The results of analysis by ID are shown in Table 2 below.

TABLE 2

| Sample | Hydrolysis stage/ duration (mins) | Heat treatment after the first stage temperature (°C.)/ duration (mins) | Heat treatment after the second stage temperature (°C.)/ duration (mins) | Titer by ID[1] for aLA | bLg | BSA | IgG |
|---|---|---|---|---|---|---|---|
| 2a | first/25 | — | — | 1/16 | ½ | 1/32 | 1/64 |
| 2b | first/70 | — | — | ½ | ½ | 1/32 | 1/32 |
| 2c | first/180 | — | — | 1/1 | 1/1 | 1/32 | 1/32 |
| 2d | first/240 | — | — | 1/1 | 1/1 | 1/32 | 1/32 |
| 2e | first/240 | 90/5 | — | 1/1 | 1/1 | ½ | 1/1 |
| 2f | first/240 + second/60 | 90/5 | — | 0 | 0 | 0 | 0 |
| 2g | first/240 + second/60 | 90/5 | 90/10 | 0 | 0 | 0 | 0 |
| Control = Starting WPC | | | | 1/1048 | 1/1048 | 1/64 | 1/128 |

Legend:
—: Absence of heat treatment
[1]: Initial concentration before dilution, 25 mg dry matter/ml

Results

Table 2 above shows that the antigenicity of the hydrolyzate can only be eliminated by the double hydrolysis with intermediate heat treatment.

In addition, analysis by SDS-PAGE shows that no band corresponding to BSA can be detected for samples 2f and 2g.

EXAMPLE 3

254.6 kg DWP, 91.3 kg WPC and 101.4 kg food-quality lactose are dispersed in 800 kg demineralized water at 60° C.

The lactose used has the following composition:

| | % |
|---|---|
| Proteins (N × 6.38) | 0.5 |
| Fats | — |
| Lactose | 94.5 |
| Ash | 0.1 |
| Moisture | 4.9 |

The above dispersion is placed in a double-walled reactor thermostatically controlled to 55° C. The dispersion has a dry matter content of 30.1% and a pH of 6.4. The pH is increased to 7.8 by addition of a 20% aqueous dispersion of Ca(OH)$_2$. 1 kg porcine trypsin (strength 6 AU/g, trypsin: chymotrypsin activity ratio 15:1–20:1 in USP) dispersed in a 0.01M aqueous solution of HCl is then added at 5° to 10° C. to initiate the hydrolysis. The initial rapid fall in the pH is then stopped, the pH being kept at 7.3 using a pH-stat by automatic compensation with a 2N aqueous KOH solution.

Hydrolysis is continued for 3 h at 55° C./pH 7.3, after which the pH is increased to 7.6 by adjustment of the pH-stat to the new value. The hydrolyzate is then passed through a plate-type heat exchanger in which it is rapidly heated to 90° C., from there into a dwell tube (flow rate 7.5 l/minute, tube volume 40 lg residence time 5 mins) and then into a second plate-type heat exchanger where it is cooled to 55° C.

The hydrolyzate is then pumped at a rate of 7.5 l/minute through a T valve into a dwell tube 0.025 m in diameter for a volume of 150 l, which corresponds to a residence time of 20 minutes over the entire length of the tube. 1 kg trypsin (same dispersion as before) is also pumped into the hydrolyzate stream at a rate of 6 l/h through the T valve at the entrance of the dwell tube. The dwell tube is divided into sections which allow progressive dwell times of 40 s to 20 mins. A hydrolyzate sample of a few ml is taken at the beginning of the tube (with no residence time) and then for each dwell time, the samples are immediately treated with the appropriate quantity of STI and are then frozen. After preheating to 80° C. with a dwell time of 5 minutes, the rest of the hydrolyzate (which has undergone a dwell time of 20 minutes) is pumped into an ultra-high temperature sterilizer where it is heated to 125° C. over a period of 2 minutes to inactivate the enzyme and to sterilize the hydrolyzate. After cooling, the hydrolyzate is dried by spray drying.

The powder obtained has the following composition:

| | % |
|---|---|
| Peptides | 23 |
| Lactose | 68 |
| Ash | 4 |
| Fats | 2 |
| Moisture | 3 |

The degree of hydrolysis, nitrogen × 100/total nitrogen (Nt), is 18% and the Nt 3.56%.

Analysis by SDS-PAGE confirms the absence of protein bands with 139 μg (5 μg Nt) and 500 μg (18 μg Nt) batches of product. In particular, no bands corresponding to the BSA, to the H and L chains of the IgG, to the aLA or to the bLG are observed. A diffuse coloured band due to the large peptides is observed near the anodic end of the gel.

ID does not show any precipitation line with the anti-BSA, anti-IgG, anti-bLG and anti-aLA sera from a sample of 100 mg dry matter/ml before dilution.

Table 3 below shows the effect of the dwell time in the second hydrolysis on BSA in particular.

TABLE 3

| Sample | Dwell time (s) | ID[1] titers BSA | IgG | bLG | BSA by SDS-PAGE (500 μg batch) |
|---|---|---|---|---|---|
| 3 a (control with no second hydrolysis) | | ↓ | ↓ | ↓ | +++ |
| 3b | 40 | ↓ | 1/1 | 0 | + |
| 3c | 120 | 1/1 | 0 | 0 | 0 |
| 3d | 360 | 1/1 or 0 | 0 | 0 | 0 |
| 3e | 720 | 1/1 or 0 | 0 | 0 | 0 |
| 3f | 1080 | 1/1 or 0 | 0 | 0 | 0 |
| 3g (with final heat treatment 125° C./2 mins) | 1080 | 0 | 0 | 0 | 0 |

Legend:
[1]: The initial concentration before dilution is 100 mg dry matter/ml

Results:

SDS-PAGE: a rapid reduction in the intensity of the BSA band is observed after only 40 s. After 2 mins, the band is hardly detectable. By comparison with successive dilutions of pure BSA, the sensitivity limit of the method is reached for batches of 50 ng (nanograms). It can be affirmed that the final concentration of BSA in the hydrolyzate after a residence time of 20 minutes is <0.01% dry matter in relation to an initial concentration estimated at 1.8 to 2.2%. ID: a titer of 0 or 1 is reached after a residence time of 6 minutes. It can be seen that hydrolysis of proteins remaining intact after the first hydrolysis takes place relatively quickly.

EXAMPLE 4

The procedure is as in Example 3, except that the quantity of enzyme added during the second hydrolysis is halved (which represents 75% of the total quantity of enzyme used in Example 3, first and second hydrolysis). The analysis of BSA by ID shows a titer of 0 to 1 after a residence time of 10 minutes. Accordingly, the quantity of enzyme used may be reduced if the residence time during the second hydrolysis increases.

EXAMPLE 5

The procedure is as in Example 3, except that the duration of the first hydrolysis is 2 h and the second hydrolysis takes place in a reactor over a period of 2 h at a constant pH of 7.3. The analyses of BSA by SDS-PAGE and ID show the disappearance of the protein in the hydrolyzate.

EXAMPLE 6

The same starting material as in Example 3 is used in the same quantity as regards the DWP, the WCP and the water and the dispersion is placed in a double-walled reactor thermostatically controlled to 55° C. 200 g of trypsin are then added and hydrolysis carried out for 10 minutes, the fall in pH being compensated by addition of 2N KOH.

The hydrolyzate is then passed through a plate-type heat exchanger in which it is heated to 90° C. over a period of 5 minutes, after which it is cooled to 55° C.

The partially hydrolyzed and heat-treated product is then placed in the reactor thermostatically controlled to 55° C. and 1.8 kg trypsin dispersed in a 0.01M aqueous HCl solution is added. The fall in pH is compensated by addition of 2N KOH.

After 3 h hydrolysis, the enzyme is inactivated and auto-digested by heating the hydrolyzate for 5 minutes at 80° C. The hydrolyzate is then sterilized for 2 minutes at 125° C.

EXAMPLE 7

The procedure is as in Example 6, except that the first hydrolysis is carried out for 10 minutes in a dwell tube. The heat treatment then takes place in the heat exchanger for 5 minutes at 90° C. The second hydrolysis takes place in the reactor as in Example 6 and the remaining operations are carried out as in Example 6.

EXAMPLE 8

The procedure is as in Example 3 up to completion of the second hydrolysis. To the hydrolyzate is then added an equivalent quantity of a solution of maltodextrin and starch having a dry matter content of 50%, to which mineral salts dissolved in demineralized water were added beforehand at 60° C. in a thermostatically controlled tank. The mixture is then heated to 75° C. in a plate-type heat exchanger, followed by the introduction of fats consisting of palm olein, coconut oil, safflower oil, lecithin and fat-soluble vitamins, the fats having been melted beforehand at 65° C. and representing 10% of the above mixture. After preheating to 80° C. with a residence time of 5 minutes, the liquid obtained is then sterilized for 2 minutes at 125° C. by direct injection of steam, cooled to 70° C. by expansion in an expansion vessel, homogenized in two stages first at 200 bar and then at 50 bar, cooled to 10° C. in a plate-type heat exchanger and then in an intermediate storage tank, followed by the addition of a 10% citric acid solution in demineralized water, water-soluble vitamins, oligoelements and taurin. Finally, the mixture is heated to 75° C., homogenized in one pass at 65–170 bar and dried by spray-drying.

The powder has the following composition:

| | % |
|---|---|
| Peptides | 12.5 |
| Fats | 26 |
| Carbohydrates | 56.2 |
| incl. lactose | 39.3 |
| maltodextrin | 10.8 |
| starch | 6.1 |
| Minerals | 2.3 |
| Vitamins and oligoelements | traces |
| Moisture | 3 |

EXAMPLE 9

The procedure is as in Example 8, except that after the second homogenization the liquid is sterilized for 2 minutes at 125° C., cooled to 10° C. and aseptically packed in containers.

The liquid has the following composition:

| | % |
|---|---|
| Peptides | 1.6 |
| Fats | 3.4 |
| Carbohydrates | 7.4 |
| incl. lactose | 5.2 |
| maltodextrin | 1.4 |
| starch | 0.8 |
| Minerals | 0.3 |
| Vitamins and oligoelements | traces |

| | % |
|---|---|
| Water | 79.9 |

We claim:

1. A process for the preparation of a hypoallergenic whey material based product comprising:
   hydrolyzing a whey material containing whey proteins with enzymes selected from a group of enzymes consisting of trypsin, chymotrypsin and pancreatin to provide a first enzymatic hydrolyzate;
   heating the first hydrolyzate for from 3 minutes to 10 minutes at a temperature of from 80° C. to 100° C. at a pH of from 6 to 8 to denature proteins remaining intact after the first hydrolysis;
   cooling the heated first hydrolyzate to a temperature of from 40° C. to 60° C.;
   subjecting the cooled first hydrolyzate to hydrolysis with enzymes selected from a group of enzymes consisting of trypsin, chymotrypsin, pancreatin and mixtures of trypsin and chymotrypsin to hydrolyze the intact denatured proteins in the first hydrolyzate for providing a second hydrolyzate substantially free of allergens of protein origin; and then
   heating the second hydrolyzate to thermally inactivate the enzyme for providing a substantially allergen-free hydrolyzate product.

2. A process according to claim 13 wherein the whey material is a whey selected from a group consisting of (i) a whey obtained from cheese making, (ii) a whey obtained from coagulation of casein by means of an agent selected from a group of agents consisting of rennet, an acid, acidifying ferments and a mixture of an acid and rennet, (iii) a whey which has been demineralized and (iv) a whey concentrate which has been demineralized and (v) combinations thereof.

3. A process according to claim 1 or 2 further comprising adding lactose to the whey material.

4. A process according to claim 1 further comprising drying the enzyme inactivated second hydrolyzate.

5. A process according to claim 1 wherein the whey material and wherein the cooled first hydrolyzate are hydrolyzed in an apparatus selected from a group of apparatus consisting of a batch reactor and a tube turbulent state reactor.

6. A process according to claim 1 wherein the cooled first hydrolyzate is hydrolyzed in a batch reactor for from 60 minutes to 180 minutes.

7. A process according to claim 1 wherein the cooled first hydrolyzate is hydrolyzed in a tube turbulent state reactor for from 1 minute to 60 minutes.

8. A process according to claim 7 wherein the cooled first hydrolyzate is hydrolyzed for from 2 minutes to 20 minutes.

9. A process according to claim 1 wherein the second hydrolyzate is heated to a temperature of at least 75° C. for about 5 minutes.

10. A process according to claim 1 further comprising sterilizing the enzyme inactivated hydrolyzate.

11. A process according to claim 1 wherein the second hydrolyzate is heated to a temperature of from 75° C. to 85° C. for about 5 minute sand further comprising sterilizing the enzyme inactivated hydrolyzate at a temperature of from 125° C. to 135° C. for from 2 minutes to 3 minutes.

12. A process according to claim 4 further comprising adding carbohydrates, mineral salts and liquid fats to the enzyme inactivated second hydrolyzate product prior to drying.

13. A process according to claim 1 further comprising adding carbohydrates, mineral salts and liquid fats to the second hydrolyzate and subsequently inactivating the enzyme.

14. A process according to claim 11 further comprising adding carbohydrates, mineral salts and liquid fats to the second hydrolyzate and subsequently inactivating the enzyme and sterilizing the enzyme inactivated product and then further comprising aeseptically packaging the product in a liquid state.

15. A hypoallergenic product comprising hydrolyzed whey protein material from which allergens selected from a group of allergens consisting of alpha-lactalbumin, beta-lactoglobulin, serum albumin and immunoglobulins have not been removed and wherein the hydrolyzed protein material including hydrolyzed allergens is in a form of hydrolysis residues having a molecular weight not above about 10,000 so that the hydrolyzed material is substantially free from allergenic proteins and allergens of protein origin.

16. A product according to claim 15 wherein the product is an infant formula.

17. A hypoallergenic product comprising hydrolyzed whey material substantially free from allergens selected from a group of allergens consisting of alpha-lactalbumin, beta-lactoglobulin, serum albumin and immunoglobulins and allergens of protein origin, and wherein the allergens of the whey material have been hydrolyzed so that the product is substantially free of proteins and residues of proteins having a molecular weight above about 10,000 produced by a process comprising:
   hydrolyzing a whey material containing whey proteins with enzymes selected from a group of enzymes consisting of trypsin, chymotrypsin and pancreatin to provide a first enzymatic hydrolyzate;
   heating the first hydrolyzate for from 3 minutes to 10 minutes at a temperature of from 80° C. to 100° C. at a pH of from 6 to 8 to denature proteins remaining intact after the first hydrolysis;
   cooling the heated first hydrolyzate to a temperature of from 40° C. to 60° C.;
   subjecting the cooled first hydrolyzate to hydrolysis with enzymes selected from a group of enzymes consisting of trypsin, chymotrypsin, pancreatin and mixtures of trypsin and chymotrypsin to hydrolyze the intact denatured proteins including allergenic proteins and allergens of protein origin in the first hydrolyzate such that the second hydrolyzate is substantially free of proteins and of residues of proteins having a molecular weight above about 10,000 for providing a second hydrolyzate substantially free of allergens selected from a group of allergens consisting of alpha-lactalbumin, beta-lactoglobulin, serum albumin and immunoglobulins and allergens of protein origin; and then
   heating the second hydrolyzate to thermally inactivate the enzyme.

18. A product according to claim 17 wherein the whey material hydrolyzed is a whey selected from the group consisting of (i) a whey obtained from cheese making, (ii) a whey obtained from coagulation of casein by means of an agent selected from a group of agents consisting of rennet, an acid, acidifying ferments and a mixture of an acid and rennet, (iii) a whey which has been demineralized and (iv) a whey concentrate which has been demineralized and (v) combinations thereof.

19. A product according to claim 17 or 18 wherein the process further comprises adding lactose to the whey material to be hydrolyzed.

20. A product according to claim 17 wherein the process further comprises drying the enzyme inactivated second hydrolyzate.

21. A product according to claim 17 wherein the process further comprises sterilizing the enzyme inactivated hydrolyzate.

22. A product according to claim 17 wherein the second hydrolyzate is heated to a temperature of from 75° C. to 85° C. for about 5 minutes and wherein the process further comprises sterilizing the enzyme inactivated hydrolyzate at a temperature of from 125° C. to 135° C. from 2 minutes to 3 minutes.

23. A product according to claim 17 further comprising adding carbohydrates, mineral salts and liquid fats to the second hydrolyzate and subsequently inactivating the enzyme.

24. A product according to claim 20 wherein the process further comprises adding carbohydrates, mineral salts and liquid fats to the enzyme inactivated second hydrolyzate product prior to drying.

25. A product according to claim 22 wherein the process further comprises adding carbohydrates, mineral salts and liquid fats to the second hydrolyzate and subsequently inactivating the enzyme and sterilizing the enzyme inactivated product.

* * * * *

UNITED STATES PATENT AND TRADEMARK OFFICE
CERTIFICATE OF CORRECTION

PATENT NO. : 5,039,532
DATED : August 13, 1991
INVENTOR(S) : Rolf JOST, et al.

It is certified that error appears in the above-identified patent and that said Letters Patent is hereby corrected as shown below:

On the title page, item [21], "273,440" should be --273,430--.

Column 11, line 29 [line 1 of claim 2], "13" should be --1--.

Column 11, line 63 [line 3 of claim 11], "minute sand" should be --minutes and--.

Signed and Sealed this

Tenth Day of November, 1992

Attest:

DOUGLAS B. COMER

Attesting Officer

Acting Commissioner of Patents and Trademarks